United States Patent
Ishimura et al.

(10) Patent No.: US 8,694,717 B2
(45) Date of Patent: Apr. 8, 2014

(54) PROGRAM UPDATE SYSTEM AND ELECTRONIC DEVICE WITH PROGRAM UPDATE FUNCTION

(75) Inventors: Shizuka Ishimura, Ora-gun (JP); Mitsuyoshi Fukuda, Ora-gun (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 451 days.

(21) Appl. No.: 12/764,609

(22) Filed: Apr. 21, 2010

(65) Prior Publication Data

US 2010/0274954 A1    Oct. 28, 2010

(30) Foreign Application Priority Data

Apr. 28, 2009  (JP) ................................ 2009-108895

(51) Int. Cl.
*G06F 13/00*    (2006.01)
*G06F 13/28*    (2006.01)
*G06F 9/44*     (2006.01)

(52) U.S. Cl.
USPC ........................... 711/103; 711/104; 717/168

(58) Field of Classification Search
USPC ................................. 711/103; 717/168–173
See application file for complete search history.

(56) References Cited

U.S. PATENT DOCUMENTS

| | | | |
|---|---|---|---|
| 6,496,978 B1 * | 12/2002 | Ito ................................ | 717/170 |
| 6,588,010 B1 * | 7/2003 | Ogata ........................... | 717/169 |
| 6,636,989 B1 * | 10/2003 | Kondo et al. .................... | 714/23 |
| 7,272,706 B2 * | 9/2007 | Ismail et al. ...................... | 713/1 |
| 2008/0013375 A1 | 1/2008 | Endo | |
| 2008/0046878 A1 * | 2/2008 | Anderson ..................... | 717/168 |

FOREIGN PATENT DOCUMENTS

| | | |
|---|---|---|
| JP | 9-265391 | 10/1997 |
| JP | 11-306010 | 11/1999 |
| JP | 2002-157136 | 5/2002 |
| JP | 2004-151831 | 5/2004 |
| JP | 2006-178829 | 7/2006 |
| JP | 2006-243997 | 9/2006 |
| JP | 2008-9945 | 1/2008 |

\* cited by examiner

*Primary Examiner* — Matthew Bradley
*Assistant Examiner* — Rocio Del Mar Perez-Velez
(74) *Attorney, Agent, or Firm* — Polansky & Associates, P.L.L.C.; Paul J. Polansky

(57) ABSTRACT

A manufacturing cost of an integrated circuit chip used in a program update system or in an electronic device with program update function is reduced. A first integrated circuit chip has a USB interface circuit, a compression decoder, a CPU and a mask ROM. The first integrated circuit chip is a single chip consolidating a microcomputer with a USB host function and the compression decoder. A second integrated circuit chip has a CPU and an FROM, and serves as a system microcomputer to control the whole system of a car audio. A control program stored in the mask ROM is updated using the FROM incorporated in the second integrated circuit chip.

6 Claims, 4 Drawing Sheets

PROGRAM UPDATE SYSTEM AND ELECTRONIC DEVICE WITH PROGRAM UPDATE FUNCTION

CROSS-REFERENCE OF THE INVENTION

This application claims priority from Japanese Patent Application No. 2009-108895, the content of which is incorporated herein by reference in its entirety.

BACKGROUND OF THE INVENTION

1. Field of the Invention

This invention relates to a program update system and an electronic device with program update function. More specifically, this invention relates to a system and an electronic device provided with function to update (version up) a control program used to decode compressed data that is taken-in from a USB (Universal Serial Bus) memory or the like.

2. Description of the Related Art

In recent years, an electronic devices such as a car audio takes-in compressed data stored in an external recording medium such as a USB memory or iPod (iPod is a registered trade mark of Apple Incorporated). Standardized audio file formats such as MP3, WMA and AAC are used as a format of the compressed data. The compressed data is decoded by a compression decoder in the electronic device and then played back as a sound through a speaker or the like. At that time, a microcomputer having a USB host function executes a control program of the compression decoder.

In this case, connectability between the electronic device and the USB memory that is available in the market at the time of shipping of the electronic device has been confirmed. That is, the compressed data taken-in from the USB memory is properly decoded by the compression decoder. However, specifications (for example, data output timing) of a USB memory that is released after the shipping of the electronic device may be modified. In that case, there may be caused a problem that the compressed data taken-in from the USB memory released after the shipping of the electronic device is not properly decoded depending on the control program that is installed in the electronic device at the time of the shipping, because the installed control program may not be able to control the compression decoder properly.

Therefore, a flash ROM (an electrically erasable programmable nonvolatile memory, hereafter referred to as an FROM) is incorporated in the electronic device so that the control program is revised using the FROM.

That is, the control program corresponding to the USB memories available in the market at the time of the shipping of the electronic device is written into the FROM in the electronic device. When a new version of USB memory is released after the shipping, update information for the control program is written into the new USB memory. The control program is revised (updated) by writing the update information into the FROM.

Methods to revise the control program of the electronic device are disclosed in Japanese Patent Application Publication Nos. 2006-243997, 2004-151831, 2002-157136 and H09-265391, for example.

In recent years, integrated circuit chips are consolidated into a smaller number of chips in order to reduce a mounting area for them. With the electronic device having the function to update the control program as described above, it is conceivable that the microcomputer having the USB host function, the FROM and the compression decoder are consolidated into a single chip. In this case, however, there is a problem that the single chip has to be manufactured using an FROM process (a manufacturing process required to form the FROM) that increases a manufacturing cost of the single chip.

That is, although the compression decoder and the microcomputer itself, that includes a CPU, a RAM and the like, do not need the FROM process in themselves, they have to be manufactured using the FROM process in order to be integrated in the single chip together with the FROM. However, the FROM process is not suitable for finer design rules required to reduce the size of devices in the single chip, because the FROM process requires a larger number of masks and an increased amount of thermal treatment compared with a logic process that is used to manufacture logic circuits. As a result, the single chip is increased in its die size as well as its manufacturing cost.

SUMMARY OF THE INVENTION

The invention provides an integrated circuit chip with program update functions. The chip includes an interface circuit interfacing with an external recording medium, a compression decoder decoding compressed data received from the external recording medium through the interface circuit, a mask ROM storing a program to control the compression decoder, and a CPU executing the program stored in the mask ROM. The mask ROM and the CPU are configured to operate as part of a ROM correction circuit correcting the program stored in the mask ROM based on update information of the program stored in the external recording medium. The integrated circuit chip is configured to transmit data to and receive data from an electrically erasable programmable nonvolatile memory external to the integrated circuit chip and is configured to write the update information received from the external recording medium through the interface circuit into the nonvolatile memory. And, the ROM correction circuit is configured to update the program stored in the mask ROM when the CPU executes the program.

The invention also provides an electronic device with program update functions. The device includes a first integrated circuit chip having an interface circuit interfacing with an external recording medium, a compression decoder decoding compressed data received from the external recording medium through the interface circuit, a mask ROM storing a first program to control the compression decoder, and a first CPU executing the first program stored in the mask ROM. The mask ROM and the first CPU operate as part of a ROM correction circuit correcting the first program stored in the mask ROM based on update information of the first program stored in the external recording medium. The device also includes a second integrated circuit chip having an electrically erasable programmable nonvolatile memory and a second CPU executing a second program stored in the nonvolatile memory and controlling the electronic device. The first integrated circuit chip is configured to transmit data to and receive data from the second integrated circuit chip and is configured to write the update information received from the external recording medium through the interface circuit into the nonvolatile memory. And, the ROM correction circuit is configured to update the first program stored in the mask ROM when the first CPU executes the first program.

DETAILED DESCRIPTION OF THE INVENTION

Figure 1:
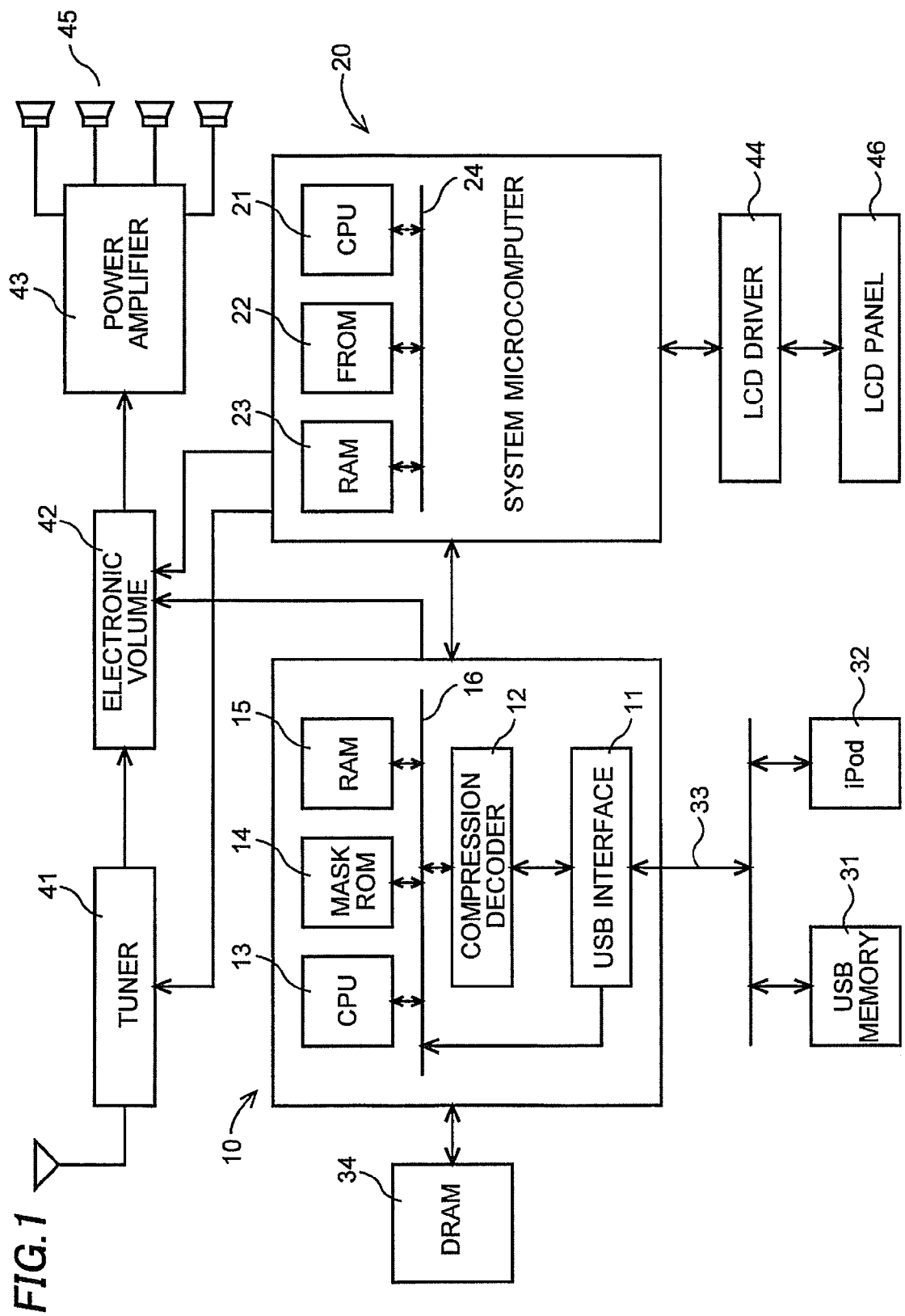
FIG. 1 is a block diagram of a program update system and an electronic device with a program update function according to an embodiment of this invention.

A program update system and an electronic device with a program update function according to an embodiment of this invention are described referring to the drawings. A car audio is taken as an example of the electronic device and is explained hereafter.

First, a system structure of the car audio is described referring to FIG. 1. A first integrated circuit chip 10 has a USB interface circuit 11, a compression decoder 12, a CPU 13, a mask ROM (Read Only Memory) 14 and a RAM (Random Access Memory) 15.

That is, the first integrated circuit chip 10 is a single chip consolidating a microcomputer with a USB host function and the compression decoder 12. It should be noted that the first integrated circuit chip 10 incorporates the mask ROM 14, not an FROM, as a memory to store a control program (before update) to control an operation of the compression decoder 12.

The mask ROM 14 is a nonvolatile read-only memory, and its ROM coding is modified by modifying an ion implantation mask, a metal mask, a contact mask or the like. It is manufactured using a less expensive process and suitable for finer design rules compared with the FROM. The RAM 15 is a memory to store data temporarily. The data stored in the RAM 15 is lost when a power supply is turned off.

The USB interface circuit 11 serves to interface the first integrated circuit chip 10 and the external recording medium such as the USB memory 31 or the iPod 32, and has a function to convert serial data transferred from the USB memory 31 into a data format that can be processed in the first integrated circuit chip 10, for example, that is, a function to convert the serial data from the USB memory 31 into parallel data, for example. The USB memory 31, the iPod 32 or the like is connected to the USB interface circuit 11 through a USB cable 33.

The compression decoder 12 decodes the compression date (in the format of MP3, WMA, AAC or the like in this case) inputted from the USB memory 31 or the like through the USB interface circuit 11.

The USB interface circuit 11, the compression decoder 12, the CPU 13, the mask ROM 14 and the RAM 15 are configured so that they can transmit/receive the data or the like to/from each other through a bus 16. In addition, a DRAM 34 is provided outside the first integrated circuit chip 10. The DRAM 34 can be used as a buffer memory to store the data transferred from the USB interface circuit 11 collectively.

A second integrated circuit chip 20 is a semiconductor chip separated from the first integrated circuit chip 10. It has a CPU 21, an FROM 22 and a RAM 23, and serves as a system microcomputer to control the whole system of the car audio. The CPU 21, the FROM 22 and the RAM 23 are configured so that they can transmit/receive the data or the like to/from each other through a bus 24. The second integrated circuit chip 20 controls operations of a tuner 41, an electronic volume 42, a power amplifier 43 and an LCD driver 44.

For example, the second integrated circuit chip 20 sends a display signal and a display instruction to the LCD driver 44. The LCD driver 44 drives an LCD panel 46 in accordance with them. A predetermined LCD display is performed as a result.

An audio signal decoded by the compression decoder 12 is inputted to the electronic volume 42 and its sound volume is adjusted based on the instruction from the second integrated circuit chip 20. The audio signal with the sound volume adjusted by the electronic volume 42 is amplified by the power amplifier 43. The audio signal amplified by the power amplifier 43 is played back as a sound through a speaker 45.

An example of an operation to update the control program stored in the mask ROM 14 in the first integrated circuit chip 10 is described hereafter. First, an operator or the like inputs update information of the control program into the USB memory 31.

When the USB memory 31 is connected to the USB interface circuit 11 through the cable 33, data communication in compliance with a USB communication protocol takes place between the USB memory 31 and the USB interface circuit 11. That is, the first integrated circuit chip 10 recognizes that the USB memory 31 is connected and sets up a state in which the update information and the compressed data can be transferred from the USB memory 31 to the USB interface circuit 11.

After that, the update information stored in the USB memory 31 is written into the FROM 22 in the second integrated circuit chip 20 through the interface circuit 11. At that time, the update information inputted through the USB interface circuit 11 may be temporarily stored in the DRAM 34 that serves as the buffer memory. By doing so, the time required to transfer the update information from the first integrated circuit chip 10 to the FROM 22 can be reduced because the update information stored in the DRAM 34 can be collectively transferred to the FROM 22.

Then, the CPU 13 takes-in the compressed data stored in the USB memory 31 through the USB interface circuit 11 and converts into the data format that can be processed by the compression decoder 12 by executing the control program. The converted compressed data is transferred to the compression decoder 12 and decoded.

The control program stored in the mask ROM is automatically updated when the CPU 13 executes the control program. That is, the update information written into the FROM 22 is transferred to the first integrated circuit chip 10 and the program stored in the mask ROM 14 is updated with a ROM correction function of the first integrated circuit chip 10. At that time, the update information written into the FROM 22 may be temporarily stored in the RAM 23 in the second integrated circuit chip 20. By doing so, the update information stored in the RAM 23 can be transferred to the first integrated circuit chip 10 collectively.

Since the first integrated circuit chip 10 according to the embodiment of this invention does not include the FROM, the single chip consolidating the microcomputer with the USB host function and the compression decoder 12 can be manufactured using the less expensive logic process.

On the other hand, the second integrated circuit chip 20, that is the system microcomputer, includes the FROM 22 in order to reduce a lead time and expedite debugging of the program.

In the embodiment of this invention, the control program stored in the mask ROM 14 is updated using the FROM 22 incorporated in the system microcomputer. As a result, it is made possible that the manufacturing cost of the car audio having the update function of the control program is reduced while the microcomputer with the USB host function and the compression decoder are consolidated into the single chip.

Regarding a structure to implement the ROM correction function (ROM correction circuit), which is to be described in detail, the update information written into the FROM 22 in the second integrated circuit chip 20 is transferred to the RAM 15 in the first integrated circuit chip 10, and the data outputted from the mask ROM 14 is corrected (replaced) based on the update information that is temporarily stored in the RAM 15.

Although the update information and the compressed data are downloaded from the USB memory 31 in the embodiment described above, the information and the data may be downloaded from other external recording medium such as the iPod 32 or an SD card.

Figure 2:
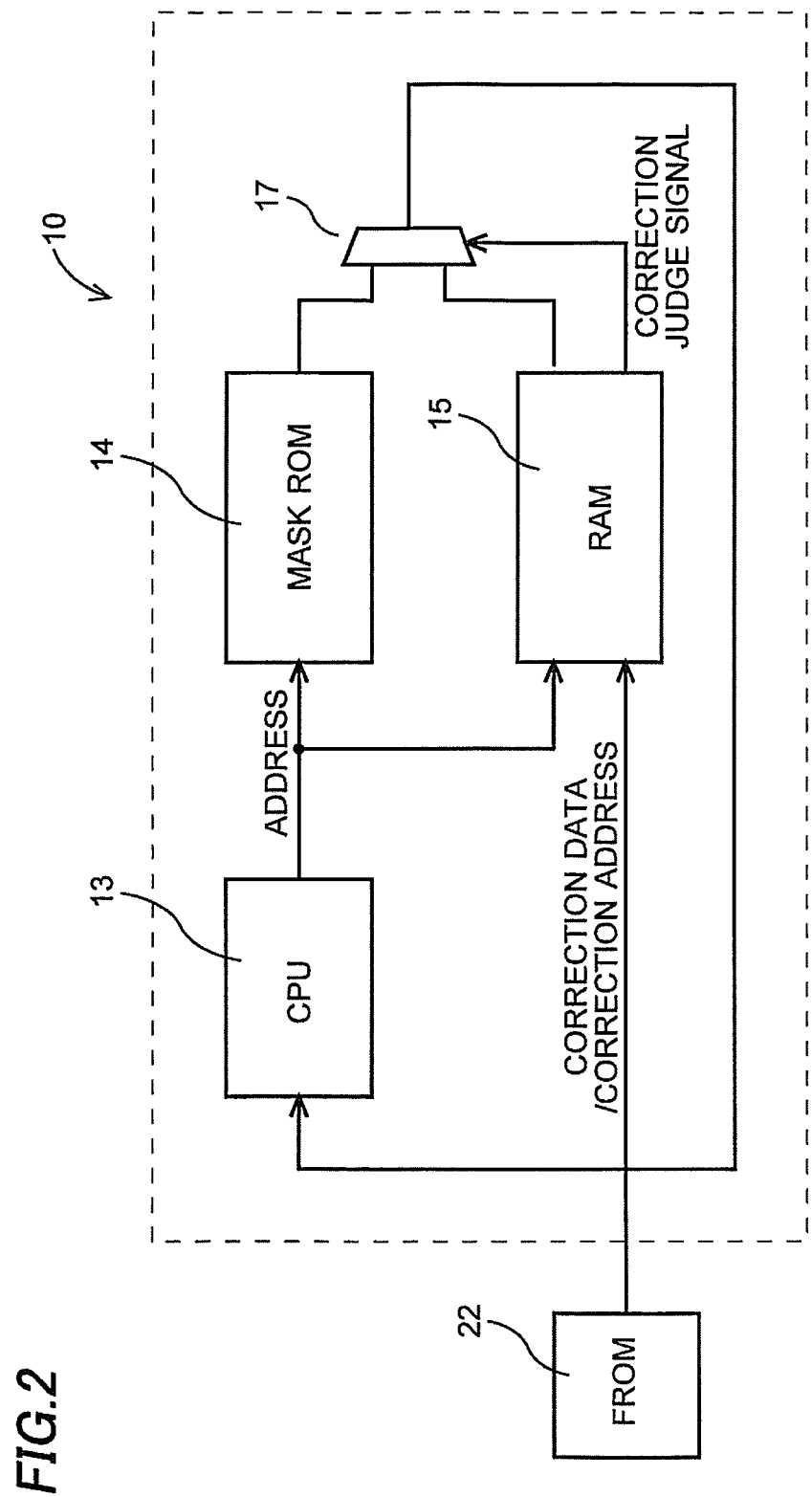
FIG. 2 is a block diagram of a ROM correction circuit.

Next, an example of the structure of the ROM correction circuit is described referring to FIG. 2. The ROM correction circuit is composed of the CPU 13, the mask ROM 14, the RAM 15 (an example of "retaining circuit") and a selection circuit (multiplexer) 17. In this case, the update information of the control program includes correction address (data) that indicates an address in the control program to be corrected (that is, a location in the original control program to be corrected) and correction data corresponding the correction address.

The correction address and the correction data are written into the FROM 22 in the second integrated circuit chip 20 as described above. The correction address and the correction data stored in the FROM 22 are transferred to the RAM 15 in the first integrated circuit chip 10 and temporarily retained in it.

The CPU 13 incorporates a program counter that sequentially outputs addresses to access the mask ROM 14. As a result, the mask ROM 14 outputs a program data (ROM code) corresponding to the address outputted from the CPU 13. The CPU outputs the address not only to the mask ROM 14 but also to the RAM 15.

The selection circuit 17 outputs the correction data when the address outputted from the CPU 13 coincides with the address retained in the RAM 15. When the address outputted from the CPU 13 does no coincide with the address retained in the RAM 15, the selection circuit 17 outputs the program data stored in the mask ROM 14 at the corresponding address.

Detection of the coincidence between the address outputted from the CPU 13 and the correction address may be carried out using arithmetic function (ALU) of the CPU 13, or may be made by a coincidence detection circuit provided in a form of hardware.

The selection circuit 17 outputs the updated (version-up) control program based on the update information, and the updated control program is inputted to the CPU 13. Since the CPU 13 executes the updated control program as a result, it is made possible that the compression decoder 12 operates properly to decode the compressed data.

Figure 3:
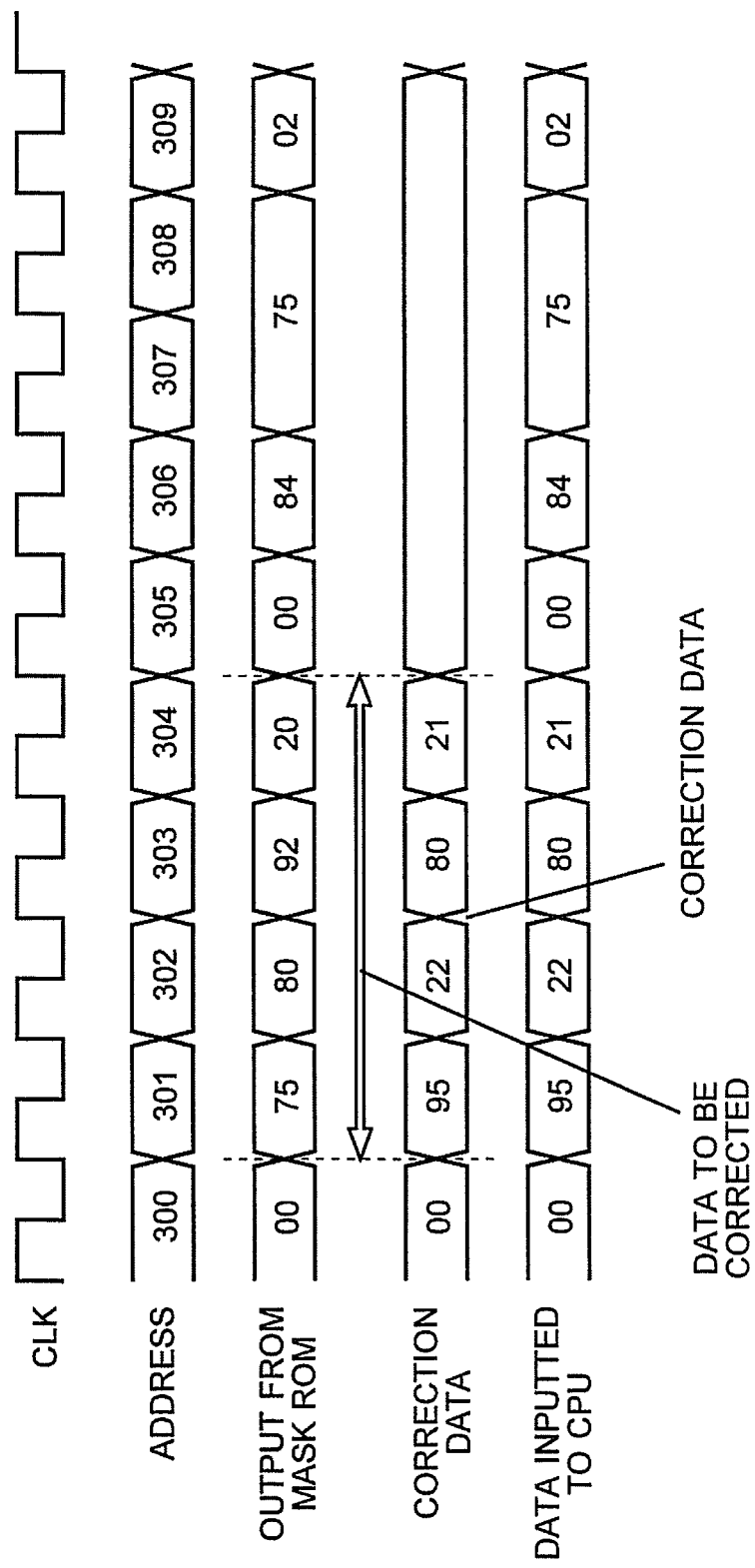
FIG. 3 is a timing chart showing an example of an operation of the ROM correction circuit.
Figure 4:
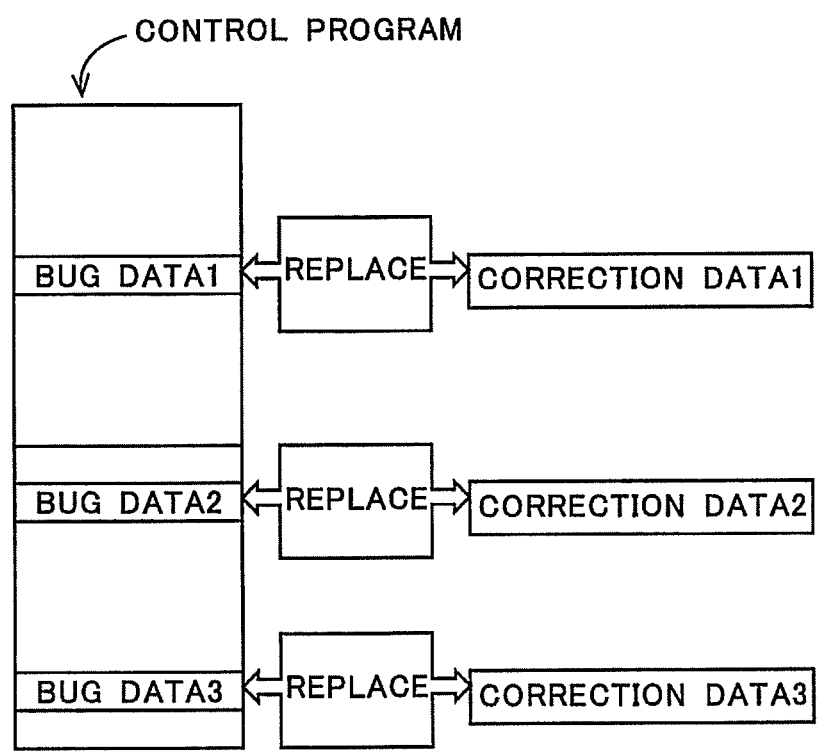
FIG. 4 shows an example of an operation of the ROM correction circuit.

Next, an example of an operation of the ROM correction circuit is described referring to FIGS. 3 and 4. The CPU 13 outputs the address in synchronization with a clock CLK, and the mask ROM 14 outputs the program data corresponding to the address as shown in FIG. 3. In this example, the correction addresses are addresses 301, 302, 303 and 304.

The outputs from the mask ROM 14 corresponding to the correction addresses 301, 302, 303 and 304 are 75, 80, 92 and 20, respectively, which are the data before the update (bug data) and are to be corrected. The ROM correction circuit replaces the grogram data to be corrected that are 75, 80, 92 and 20 with the correction data that are 95, 22, 80 and 21, respectively. The correction data 95, 22, 80 and 21 are inputted to the CPU 13 through the selection circuit 17.

The outputs from the mask ROM 14 at addresses other than the correction addresses, for example at addresses 305-309, are 00, 84, 75 and 02. There is no correction data for them because they are correct program data. Therefore, the outputs 00, 84, 75 and 02 from the mask ROM 14 are inputted to the CPU 13 through the selection circuit 17 without changing.

The ROM correction circuit replaces the bug data with the correction data as described above. Such replacement may be carried out in several locations. As shown in FIG. 4, each of bug data 1-3 in three locations is replaced with each of three correction data 1-3, respectively.

Although the embodiment of this invention is described taking the car audio as the example, this invention is not limited the above, and may be applied to other audio devices and video devices having a compression decoder to decode compressed data (not only the audio file formats but also video formats) using a control program.

According to the embodiment of this invention, it is made possible to reduce the manufacturing cost of the integrated circuit chip used in the program update system or in the electronic device with program update function.

What is claimed is:

1. An electronic device with program update functions, comprising:

a first integrated circuit chip comprising an interface circuit interfacing with and directly connected to an external recording medium, a compression decoder decoding compressed data received from the external recording medium through the interface circuit, a mask ROM storing a first program to control the compression decoder, and a first CPU executing the first program stored in the mask ROM, the mask ROM and the first CPU operating as part of a ROM correction circuit correcting the first program stored in the mask ROM based on update information of the first program stored in the external recording medium; and a second integrated circuit chip comprising an electrically erasable programmable nonvolatile memory and a second CPU executing a second program stored in the nonvolatile memory, the second integrated circuit chip being formed as one chip, and the second integrated circuit chip controlling the entire electronic device, wherein the first integrated circuit chip is configured to transmit data to and receive data from the second integrated circuit chip and is configured to write the update information received from the external recording medium through the interface circuit into the nonvolatile memory, the ROM correction circuit is configured to update the first program based on the update information received from the nonvolatile memory of the second integrated circuit chip when the first CPU executes the first program, and the external recording medium stores only the update information and does not store a whole program that controls the compression decoder.

2. The electronic device with program update function of claim 1, wherein the interface circuit comprises a USB interface circuit interfacing with a universal serial bus.

3. The electronic device with program update function of claim 1, wherein the nonvolatile memory comprises a flash memory.

4. The electronic device with program update function of claim 1, wherein the update information comprises a correction address that is an address in the mask ROM for update and program correction data that replaces program data stored in said address in the mask ROM, and the ROM correction circuit further comprises a retaining circuit temporarily retaining the correction address and the program correction data received from the nonvolatile memory and a selection circuit outputting to the first CPU the program correction data when an address outputted from the first CPU coincides with the correction address temporarily retained in the retaining circuit and outputting to the first CPU program data stored in the mask ROM when the address outputted from the first CPU does not coincide with the correction address.

5. The electronic device with program update function of claim 4, wherein the retaining circuit comprises a random access memory.

6. An audio device with program update functions, comprising:
- a tuner;
- an electric volume control;
- a power amplifier for speakers;
- an LCD panel;
- an LCD driver driving the LCD panel;
- a first integrated circuit chip comprising an interface circuit interfacing with an external USB memory, a compression decoder decoding compressed audio data received from the external USB memory through the interface circuit, a mask ROM storing a decoding program to control the compression decoder to decode the compressed audio data, and a first CPU executing the decoding program stored in the mask ROM, the mask ROM and the first CPU operating as part of a ROM correction circuit correcting the decoding program stored in the mask ROM based on update information of the decoding program stored in the external USB memory; and
- a second integrated circuit chip comprising an electrically erasable programmable nonvolatile memory and a second CPU executing an operation program stored in the nonvolatile memory, the second integrated circuit chip being formed as one chip, and the second integrated circuit chip controlling the tuner, the electric volume control and the LCD driver wherein the first integrated circuit chip is configured to transmit data to and receive data from the second integrated circuit chip and is configured to write the update information received from the external USB memory through the interface circuit into the nonvolatile memory, the ROM correction circuit is configured to update the decoding program based on the update information received from the nonvolatile memory of the second integrated circuit chip when the first CPU executes the decoding program, and the external USB memory stores only the update information and does not store a whole program that controls the compression decoder.

* * * * *